C. P. COE.
CALCULATING DEVICE.
APPLICATION FILED MAR. 22, 1912.
1,049,997.
Patented Jan. 7, 1913.
2 SHEETS—SHEET 1.
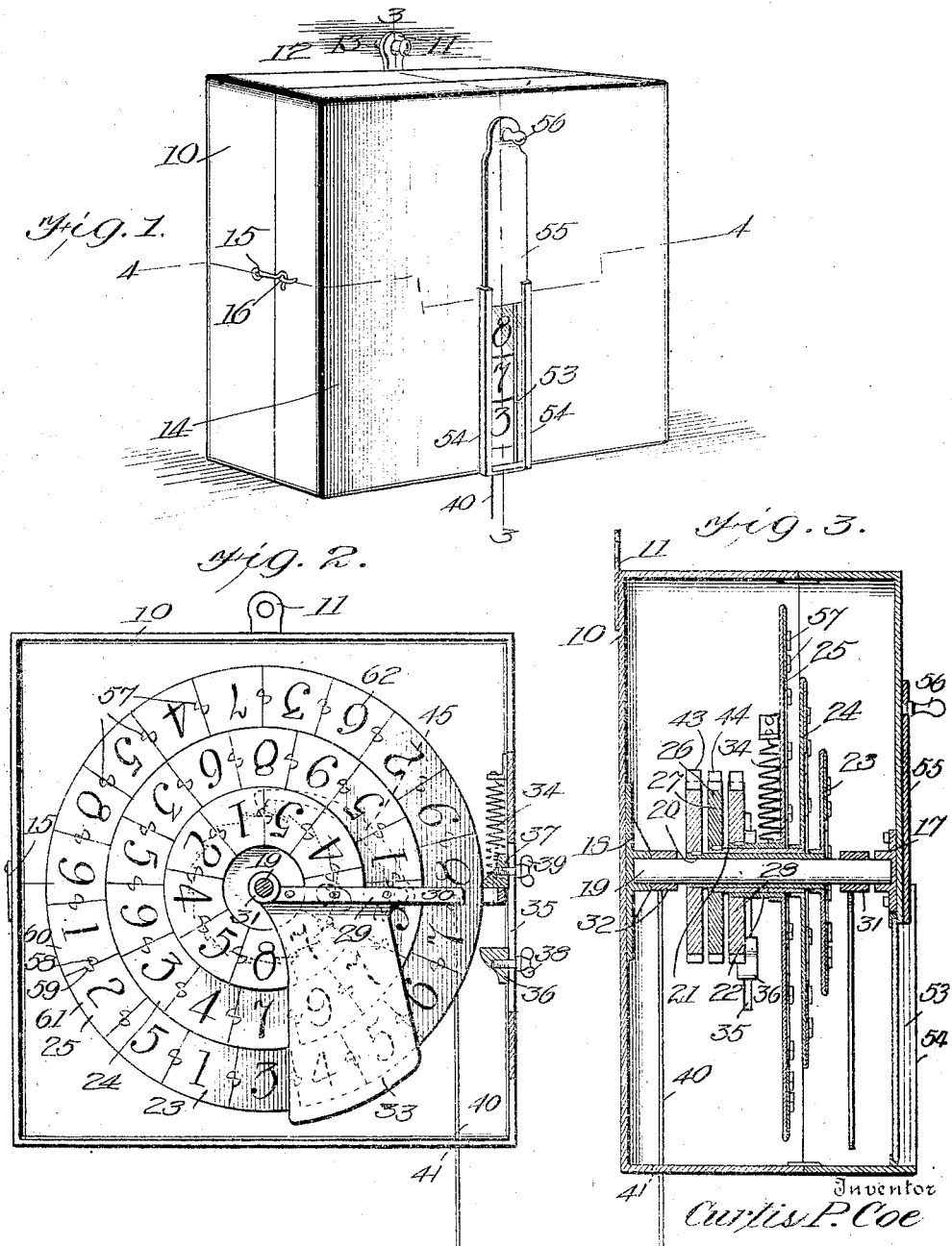
Witnesses
F. C. Barry
F. W. Foster
Inventor
Curtis P. Coe
By Victor J. Evans
Attorney C. P. COE.
CALCULATING DEVICE.
APPLICATION FILED MAR. 22, 1912.
1,049,997.
Patented Jan. 7, 1913.
2 SHEETS—SHEET 2.
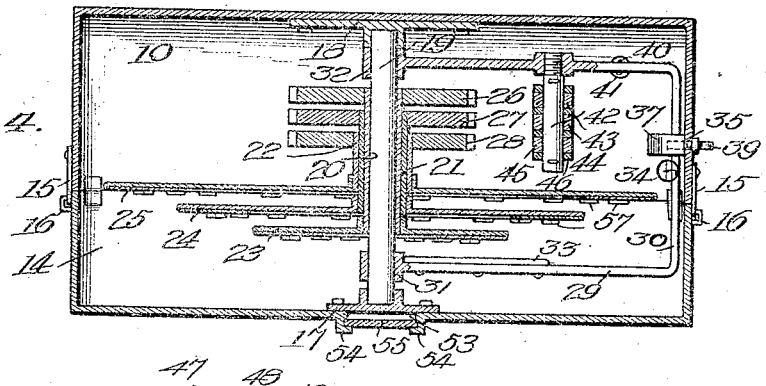
Fig. 4.
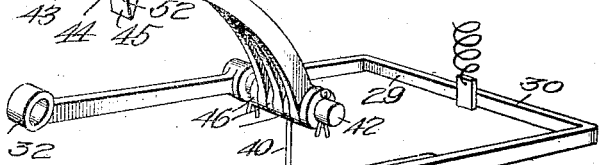
Fig. 5.
Fig. 6.
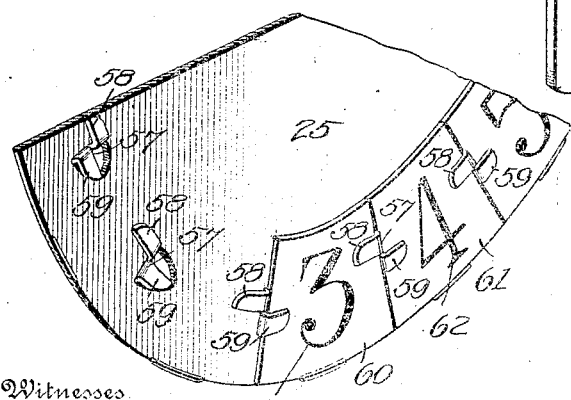
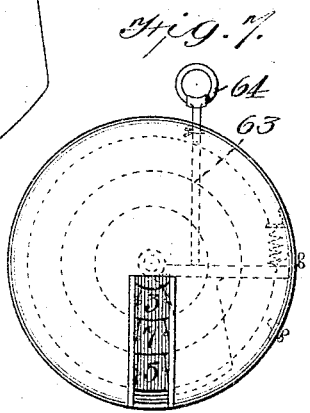
Fig. 7.
Witnesses
H. C. Barry
J. H. Hosler
Inventor
Curtis P. Coe
By Victor J. Evans
Attorney

UNITED STATES PATENT OFFICE.

CURTIS P. COE, OF McMINNVILLE, OREGON.

CALCULATING DEVICE.

1,049,997.  Specification of Letters Patent.  Patented Jan. 7, 1913.

Application filed March 22, 1912. Serial No. 685,421.

*To all whom it may concern:*

Be it known that I, CURTIS P. COE, a citizen of the United States, residing at McMinnville, in the county of Yamhill and State of Oregon, have invented new and useful Improvements in Calculating Devices, of which the following is a specification.

The invention relates to educational appliances and has for an object to provide a device for the instruction of pupils and students.

The invention embodies, among other features, a device which can be conveniently placed on the front wall of a schoolroom and which is operable to disclose to the pupils a plurality or series of numbers, said numbers to be relatively added, subtracted or multiplied the moment they are disclosed, the device being operable to disclose various combinations of numbers to be added, subtracted or multiplied, thus training the brain and eye of the student to readily derive a correct sum, remainder or quotient.

In the further disclosure of the invention, reference is to be had to the accompanying drawings constituting a part of this specification, in which similar characters of reference denote corresponding parts in all the views, and in which—

Figure 1 is a perspective view of my device, showing the same in applied position. Fig. 2 is a front elevation, the cover having been removed to show the interior construction. Fig. 3 is a vertical transverse sectional view taken on the line 3—3 in Fig. 1. Fig. 4 is a horizontal sectional view taken on the line 4—4 in Fig. 1. Fig. 5 is a perspective view of the actuating member. Fig. 6 is a fragmentary perspective view of one of the dials, showing the manner of removably attaching the number cards thereto. Fig. 7 is a front elevation of a modified form of my device, parts being broken away to disclose the underlying structure.

Referring more particularly to the views, use is made of a casing 10 having an eye 11 attached thereto for supporting the casing on a wall 12 by means of a pin 13, as shown in Fig. 1, a cover 14 being provided for the casing 10 and retained in engagement therewith by hooks 15 mounted on the casing to engage eyes 16 secured to the cover 14.

Secured to the inner side of the cover 14 is a bearing 17 and secured to the inner side of the rear wall of the casing 10 is a similar bearing 18, said bearings 17 and 18 of the respective cover 14 and casing 10, being arranged to horizontally aline when the cover is mounted on the casing, a horizontally extending shaft 19 being journaled in the bearings 17, 18 as shown in Fig. 3. A plurality of collars 20, 21, 22 are mounted to encircle the shaft 19, the innermost collar 20 being mounted to loosely encircle the shaft, the second collar 21 being mounted to loosely encircle the collar 20 and the third collar 22 being mounted to loosely encircle the collar 21, the collar 21 being of a greater length than the collar 22 and the collar 20 being of a greater length than the collar 21 as shown. Rigidly secured to the front ends of the collars 20, 21 and 22 are dials 23, 24 and 25 respectively, the intermediate dial 24 being of a greater diameter than the dial 23 and the innermost dial 25 being of a greater diameter than the diameter of the intermediate dial 24, the mentioned dials being secured to the forward extremities of the respective collars so that the dials will be arranged in relatively spaced position. Rigidly secured to the rear ends of the collars 20, 21, 22 and relatively spaced apart are toothed wheels 26, 27 and 28 respectively, the dials 23, 24 and 25 through the medium of the collars 20, 21 and 22 being adapted to revolve with the respective toothed wheels 26, 27 and 28 for a purpose that will be hereinafter more fully disclosed.

An actuating member 29 comprises a U-shaped frame 30 provided at the forward free ends with bearings 31, 32 journaled on the shaft 19 with the bearing 31 arranged adjacent to the dial 23 and the bearing 32 arranged adjacent to the toothed wheel 26, a closure 33 being integrally formed on the frame 30 and depending therefrom as shown in Fig. 5. It will be readily understood that the actuating member 29, mounted as mentioned, will gravitationally swing downwardly and in order to retain the actuating member in normal position, a contractile helical spring 34 has an end thereof secured to the frame 30, the other end of the spring being secured to an inner side of the casing 10, thus retaining the actuating member 29 in normal position, the closure 33 being in open position when the actuating member is in normal position. A vertical slot 35 is provided in the casing 10 and mounted to slide therein and extending within the casing are stop members 36, 37, the mentioned stop members being provided with exterior thumb nuts 38, 39 for adjusting the stop members 36, 37 in the slot 35, the stop member 37 being arranged above the stop member 36 and adapted to be engaged by the upper side of the frame 30 of the actuating member 29, to limit the upward swinging movement of the actuating member, the lower stop member 36 being adapted to be engaged by the lower side of the frame 30 of the actuating member 29 to limit the downward movement of the actuating member. Thus by adjusting the stop members 36, 37 in the slot 35, the stroke or swinging movement of the actuating member 29 can be increased or decreased as desired. Secured to the frame 30 of the actuating member 29, between the ends of the frame is an operating cord 40 arranged to depend from the frame 30 and extending through an opening 41 in the casing 10 to depend exteriorly of the casing, as shown in Fig. 1 and rigidly secured to the frame 30 is a horizontally extending shaft 42 having journaled thereon a series of gravitationally movable dogs 43, 44, 45, the dogs being retained in spaced relation by suitable washers 46 with the free end of the dog 43 adapted to normally repose upon the toothed wheel 26 and mesh with the teeth thereof, the free end of the dog 44 being arranged to repose upon the toothed wheel 27 and mesh with the teeth thereof and the free end of the dog 45 being mounted to repose upon the toothed wheel 28 and mesh with the teeth thereof, the free ends of the mentioned dogs being preferably enlarged and weighted to form heads 47, 48 and 49, converging at their lower ends to form teeth 50, 51, 52 in mesh with the teeth of the wheels 26, 27 and 28 respectively.

The casing 10 and cover 14 are preferably made of stamped metal and the cover 14 is provided with a vertically extending opening 53, the longitudinal edges of which are bent outwardly to form a track 54 having slidably mounted thereon, a closure 55 provided with a handle 56, the said closure being movable to increase or decrease the size of the opening 53 for a purpose that will be hereinafter more fully disclosed.

The dials 23, 24 and 25 are preferably made of stamped metal and struck upwardly from the dials are tongues 57, said tongues each being then split to form securing lugs 58, 59, the lug 58 being bent in one direction to overlap a number card 60 and the lug 59 being bent in the other direction to overlap second adjacent number card 61, the said number cards being arranged in a circular fashion on the front faces of the dials 23, 24 and 25 by passing the cards beneath the lugs 58, 59, said lugs being adapted to secure the number cards in place, with the lug 58 of one tongue 57 adapted to secure one side of the number card 60 and the lug 59 of the same tongue 57 being adapted to secure a side of the adjacent number card 61. The number cards are provided with numerals 62 and by referring to Fig. 2, it will be seen that the number cards are arranged upon the dials, adjacent the peripheries thereof so that the dial 23 will not overlap the cover end of the number cards on the dial 24 and the dial 24 will not overlap the cover end of the numbers on the dial 25, the numerals on the number cards, when the same are arranged on the dials as mentioned, being adapted to extend diametrically to the dials so that the numbers will be arranged in diametrical rows and when the closure 55 is in open position, one of the diametrically extending rows of numbers will be disclosed through the opening 53 as shown in Fig. 1.

In the use of my device, for the purpose of instructing pupils in the method of addition, I will assume that my device is mounted on the front wall of a schoolroom and that the closure 55 is in open position, to disclose to the pupils a row of numbers as shown in Fig. 1, the numbers when seen through the opening 53 being arranged in vertical order. The teacher now calls upon the first pupil to orally state the sum of the numbers disclosed and when the pupil has answered correctly and given the correct sum, the teacher pulls the cord 40, thus swinging the actuating member 29 downwardly against the action of the spring 34 to move the closure 33 into closed position, thus closing the opening 53 so that the dials 23, 24, 25 and the numbers thereon cannot be seen through the opening 53. At the moment that the actuating member 29 swings downwardly as mentioned, the dogs 43, 44 and 45, gravitationally engaging the respective toothed wheels 26, 27 and 28 will revolve the toothed wheels simultaneously, thus simultaneously revolving the dials 23, 24 or 25 to move the next diametrically extending row of numbers into registration with the opening 53. The teacher now releases the cord 40 and the action of the spring 34 will swing the actuating member 29 upwardly, thus moving the closure 33 to open position and disclosing to the pupils a new series of numbers, the dogs 43, 44 and 45 being adapted to loosely ride over the teeth of the wheels 26, 27 and 28 respectively, when the actuating member swings upwardly to normal position and the teacher now calls upon the next pupil to orally state the sum of the numbers presented to view. It will thus be seen that each time the cord 40 is pulled, the mechanism of my device will be actuated to close the opening 53 and simultaneously move the dials 23, 24 and 25 to move into position a new row of numbers, after which the closure 33 swinging with the actuating member 29, returns to open position to present to the pupils the new row of numbers to be added.

In the use of the device in multiplication work, the closure 55 is moved downwardly to restrict the opening 53, thus entirely cutting off a view of the smallest dial 23 so that the numbers thereon cannot be seen through the opening 53 and thus each time that the cord 40 is pulled downwardly and then released, a row of two numbers will be shown and the pupils will be called upon to orally state the result when the two numbers are multiplied. The device can also be used in this manner to add two numbers instead of three, as mentioned heretofore, and shown in Fig. 1 and in order to permit of easily disclosing to the pupil the method of subtraction in mathematics, the numbers on the intermediate dial 24 are preferably made of larger denomination than the numbers on the largest dial 25 so that when two numbers are presented to view to be subtracted, the smaller number will appear beneath the larger number thus disclosing to the eye of the student the numbers arranged as they would be if they were written on paper for the purpose of subtraction. By moving the closure 55 downwardly to disclose only one number at a time, pupils in lower grades can be taught the different numbers, the numbers being preferably arranged on the dials in the usual arithmetical series so that each time the cord 40 is pulled downwardly, if the device is initially operated to disclose the numeral 1, the next succeeding number will be of higher denomination, or the numeral 2. For pupils in advanced grades my device can be readily adapted to the method of division, some of the quotients in this instance being whole numbers, whereas others will result in fractions. It will thus be seen that with a device of the class described various fundamental branches of mathematics can be efficiently and easily taught the pupils and although I have only shown the numbers arranged in rows with three numbers in a row, it will be readily understood that additional dials can be provided to disclose to the pupil rows of numbers having four, five, six and more numerals in each row and if desirable instead of employing numbers on the dials, the letters of the alphabet can be arranged thereon, the number cards being removable for the purpose of inserting new number cards or cards bearing other designs or characters. Now assuming that the dials have simultaneously completed an entire revolution or cycle, if an instructor desires to change the combinations of the numbers, the same can be easily accomplished by simply inserting a finger in the opening 53 and moving one of the dials toward the right, this procedure resulting in a new combination of numbers being disclosed to view each time that the dials are operated until the same have completed another cycle, after which one of the dials can again be moved one number toward the right by inserting a finger in the opening in the manner described heretofore, to disclose to the pupils still another combination of numbers.

In Fig. 7 I disclose a modified form of my device and in which instance the structure shown is that of a device similar to the device described with the exception that the structure shown in Fig. 7 is made of a size similar to that of an ordinary watch and in place of the cord 40 for operating the actuating member 29, a stem 63 is employed, said stem projecting exteriorly of the casing of the structure disclosed in Fig. 7 and provided on the exterior end thereof with a ring 64, said ring being adapted to receive the usual watch chain so that the ring and stem will constitute a supporting member and an actuating member, the device being made to fit a vest pocket and about the size of a watch as mentioned heretofore.

I claim:—

1. In a calculating device, the combination with a casing, of an apertured cover therefor, a shaft journaled in the said casing, a series of independently revoluble dials mounted to encircle the said shaft, character cards for removable connection with the said dials and movable therewith to register with the aperture in the said cover, a spring engaged actuating member mounted to swing on the said shaft, means connecting said actuating member with the said dials for simultaneously operating the said dials when the said actuating member is operated, means for operating the said actuating member, a closure movable with the actuating member to close the aperture in the said cover when the said dials are operated and stop members adjustably mounted in the said casing for limiting the swinging movement of the said actuating member.

2. In a calculating device, the combination with a casing, of an apertured cover therefor, a shaft journaled in the said casing, a series of independently revoluble dials mounted to encircle the said shaft, character cards for removable connection with the said dials and movable therewith to register with the aperture in the said cover, an actuating member mounted to swing on the said shaft, means connecting said actuating member with the said dials for simultaneously operating the said dials when the said actuating member is operated, means for operating the said actuating member, a closure movable with the actuating member to close the aperture in the said cover when the said dials are operated and means adjustably mounted in the said casing for limiting the swinging movement of the said actuating member.

3. In a calculating device, the combination with a casing, of an apertured cover therefor, a shaft journaled in the said casing, a series of independently revoluble dials mounted to encircle the said shaft, character cards for removable connection with the said dials and movable therewith to register with the aperture in the said cover, an actuating member mounted to swing on the said shaft, means connecting said actuating member with the said dials for simultaneously operating the said dials when the said actuating member is operated, means for operating the said actuating member and a closure movable with the actuating member to close the aperture in the said cover when the said dials are operated.

4. In a calculating device, the combination with a casing, of an apertured cover therefor, a shaft journaled in the said casing, a series of independently revoluble dials mounted to encircle the said shaft, character cards for removable connection with the said dials and movable therewith to register with the aperture in the said cover, an actuating member mounted to swing on the said shaft, means connecting said actuating member with the said dials for simultaneously operating the said dials when the said actuating member is operated and means for operating the said actuating member.

5. In a calculating device the combination with a casing, of an apertured cover therefor, a series of independently revoluble dials mounted in the said casing and provided with characters movable with the dials to register with the aperture in the said cover, an actuating member mounted to swing in the said casing and connected with the dials to simultaneously operate the same, means adjustably mounted on the said casing to limit the swinging movement of the said actuating member and means connected to the said actuating member and extending exteriorly of the said casing for operating the same to move the said dials.

6. In a calculating device the combination with a casing, of an apertured cover therefor, a series of independently revoluble dials mounted in the said casing and provided with characters movable with the dials to register with the aperture in the said cover, an actuating member mounted to swing in the said casing and connected with the said dials to simultaneously operate the same and means adjustably mounted on the said casing to limit the swinging movement of the said actuating member.

7. In a calculating device, the combination with a casing, of a cover therefor, a closure mounted to slide on the cover to restrict an opening formed therein, a series of independently revoluble dials mounted within the said casing and provided with characters on the faces thereof, said characters being movable with said dials to register with the opening in the said cover, an actuating member mounted in the said casing and connected with the said dials to simultaneously operate the same, a closure movable with the said actuating member to close the opening in the said cover when the said dials are operated and means connected with the said actuating member and extending exteriorly of the casing for operating the said actuating member.

8. In a calculating device, the combination with a casing, of a cover therefor, a closure mounted to slide on the cover to restrict an opening formed therein, a series of independently revoluble dials mounted within the said casing and provided with characters on the faces thereof, said characters being movable with said dials to register with the opening in the said cover, an actuating member mounted in the said casing and connected with the said dials to simultaneously operate the same and a closure movable with the said actuating member to close the opening in the said cover when the said dials are operated.

9. In a calculating device, the combination with a casing provided with an opening, of a series of dials revolubly mounted within the said casing and provided with characters movable with the dials to register with the said opening, spring engaged means mounted in the casing and connected with the said dials for simultaneously operating the same and a closure operable simultaneously with the operation of the said dials to close the opening in the casing at the moment that the said dials are operated.

10. In a calculating device, the combination with a casing provided with an opening, of a closure for restricting the size of the said opening, a series of dials revolubly mounted within the said casing and provided with characters adapted to register with the said opening when the said dials are operated, an actuating member mounted in the casing and connected with the said dials for simultaneously operating the same and a closure movable with the said actuating member to close the said opening at the moment that the said dials are operated.

11. In a calculating device, the combination with a casing provided with an opening, of a series of dials mounted therein and provided with characters on the faces thereof, a closure for the said opening and means mounted in the said casing for simultaneously operating the said dials and the said closure to close the said opening when the said dials are operated.

In testimony whereof I affix my signature in presence of two witnesses.

CURTIS P. COE.

Witnesses:
CECIL GOSS,
SALLIE BOSWELL.